Patented May 12, 1953

2,638,454

UNITED STATES PATENT OFFICE 2,638,454

CATALYST PREPARATION

Robert Rowan, Jr., Silver Spring, Md., assignor to Standard Oil Development Company, a corporation of Delaware No Drawing. Application August 22, 1950, Serial No. 180,903

8 Claims. (Cl. 252—455)

The present invention relates to new and improved catalysts and a process for their preparation. The invention in its broader phases also comprises improvements in catalytic conversion processes, particularly the hydroforming of hydrocarbon oils, in the presence of these new and improved catalysts. More specifically, the invention pertains to the conversion of naphthenic hydrocarbons into aromatics at elevated temperatures in the presence of a catalyst and added hydrogen wherein the catalyst is prepared by incorporating in a novel manner molybdates of iron group metals into a catalyst base comprising alumina and clay.

It is well known in the art that aromatics, such as toluene, may be produced by hydroforming naphtha fractions containing suitable naphthenes, such as methyl-cyclohexane, or the like, with a catalyst consisting of molybdenum oxide supported on "activated alumina" at elevated temperatures in the presence of added hydrogen. In the course of this reaction, carbon and other carbonaceous solids are deposited on the catalyst whereby the activity of the catalyst is reduced. In order to restore catalyst activity these deposits must be removed by regeneration of the catalyst at relatively high temperatures of about 1100°–1200° F. in cyclic or continuous fashion. Catalysts to be useful in hydroforming processes of this type, therefore, must be such as will withstand treatment at these high regeneration temperatures without being impaired with respect to their activity, for example by loss of porosity or otherwise. The present invention provides such catalysts.

It is, therefore, the principal object of the invention to provide new alumina base catalysts of improved thermal stability which may be used to advantage in hydroforming hydrocarbon oils and in similar processes.

In accordance with the present invention, highly heat resistant hydroforming catalysts of excellent activity are prepared by incorporating into alumina-trihydrate of low sodium content an oxidic compound of molybdenum with an iron group metal, i. e. cobalt, nickel or iron, heat-activating the composite at elevated temperatures, mixing the activated composite with a plastic clay of low soda content and thereafter again heat-activating the catalyst composition at elevated temperatures.

Prior to the present invention it has been suggested to incorporate molybdena into catalyst bases comprising alumina and clay. In these processes the clay was mixed with alumina prior to the addition of the molybdena and prior to any heat-activation. In accordance with the invention, on the other hand, the clay is added after the catalytically active metal component and after a step of heat-activation. This difference is believed to be responsible for the superior heat-resistance of the new catalysts. In addition, the catalytically active metal component added in accordance with the invention is a molybdate of an iron group metal or a similar combination of molybdena with an oxide of the iron group whereby catalysts of increased aromatizing activity are obtained.

The catalysts of the invention are prepared as follows. A quantity of alumina trihydrate $Al_2O_3.3H_2O$, such as trihydrate-bayerite or gibbsite previously purified so that its soda content is about 0.2–0.3%, is impregnated by wetting with an ammoniacal solution of $MoO_3$ and cobalt or nickel nitrate in stoichiometrical proportions to the extent of about 5–25% metal molybdate in the composite. It is preferred to carry out the impregnation in two stages with drying at about 220° F. between stages. After the last impregnation, the material is dried and heated for about 4 to 8 hours at about 1100°–1200° F. for the purpose of converting the metal salts into the molybdate form and to activate the catalyst. The material so heat-activated is mixed with about 5–35% of a low soda ($Na_2O=0.06$–$0.14\%$) plastic clay. The mixture is moistened with water, dried, pilled and heat-activated again for about 4–8 hours at about 1100°–1200° F.

Instead of cobalt or nickel nitrates, any salt of these metals can be used which is soluble in a solvent in which a compound of Mo is also soluble, and which can be decomposed by heating into the metal or oxide, such as the hydroxides or oxalates. An aqueous solution of ammonium hydroxide is the preferred medium for the solution of cobalt or nickel molybdate as described above. Alternately, the iron group metal salt and the $MoO_3$ as $(NH_4)_2MoO_4$ may be deposited separately upon the surface of the alumina base, after which the metal molybdate is formed during the heat treating step. This is the preferred way for preparing an iron molybdate catalyst.

In addition to the metal molybdate, 1–15% of $MoO_3$ or 1–15% of iron group metal oxide may be present in the catalyst.

Example I

Alumina trihydrate containing about 1% $Na_2O$ was purified with acetic acid to reduce the soda content to about 0.2%. Some 2.5 liters of glacial acetic acid was added per 100 lbs. of trihydrate and the mixture was agitated. An ammonium molybdate solution was prepared by adding 360 grams of molybdenum oxide per liter of dilute ammonium hydroxide. Of this solution, an amount sufficient to introduce about 8% molybdenum oxide into the final catalyst was added to the trihydrate. The mixture was dried and activated at 1150°–1200° F. in an oven. Plastic clay in an amount of about 20% based on the alumina trihydrate was mixed with this material and the mixture was moistened, extruded, dried and activated at 1150°–1200° F.

Example II

A cobalt molybdate solution was prepared by pouring 922 c. c. of ammonium molybdate solution (339 g. $MoO_3$/liter of solution) over 631 g. of $Co(NO_3)_2.6H_2O$. To this was added 900 c. c. of ammonium hydroxide. The total volume of solution at this point was 2075 c. c. A 1200 c. c. portion of the cobalt molybdate solution was added to 2000 g. of alumina trihydrate and the mass was thoroughly mixed. The mixture was placed in a steam oven to dry.

After drying, the impregnated alumina hydrate was brought slowly to 700° F. in a muffle furnace to remove ammonium nitrate and heated for three hours. The catalyst was cooled, the rest of the cobalt molybdate solution was added, and the mixture was again placed in the steam oven to dry. After drying, the material was activated at 1200° F. for six hours.

To the activated mass, 500 g. of Parson's clay was added and the clay was thoroughly mixed in. Water (915 c. c.) was added to make an extrudable mixture. The mixture was placed in a steam oven, dried, pilled and activated for six hours at 1200° F.

Example III

About 1200 gs. of alumina trihydrate purified as in Example I to contain about 0.2% $Na_2O$ was weighed into an evaporating dish. About 1300 c. c. of a cobalt molybdate solution was prepared by pouring 554 c. c. of $(NH_4)_2MoO_4$ solution on 379 grams $Co(NO_3)_2 6H_2O$, adding 500 c. c. ammonium hydroxide and mixing well in a closed flask. About 650 c. c. of this solution was used to impregnate the trihydrate in the evaporating dish. The mixture was stirred while drying in a steam oven. The dried material was heated for 3 hours at 700° F. After cooling and breaking up lumps, the last 650 c. c. of cobalt molybdate solution was added. The mixture was stirred and dried in a steam oven. Thereafter it was activated by heating at 1150° F. for 5 hours. About 240 gs. of Parson's clay, which is a low soda content plastic clay, was added and mixed well with the mass. Then 450 c. c. of water was added and the mass was well mixed. Thereafter, the mass was dried, pilled and activated as in Example II.

Example IV

A nickel molybdate catalyst may be prepared as follows. About 339 gs. of $Ni(NO_3)_2.6H_2O$ are dissolved in 200 c. c. of concentrated $NH_4OH$. The solution is poured into 494 c. c. of an ammonium molybdate solution prepared as described in Example II. About 150 c. c. of $NH_4OH$ and 10 c. c. of water are added and the mixture is stirred until clear. Abount one-half of this solution is mixed with 1200 gs. low-soda alumina trihydrate, stirred and dried in a steam oven until a crumbly mass results. The dried material is heated in a muffle for 3 hours at 700° F. Lumps are broken up and the other half of the nickel molybdate solution is added and mixed well. The material is then dried and heated for 5–6 hours at 1150° F. Thereafter 240 gs. of low-soda plastic clay is added and while mixing well 300 c. c. of water is slowly introduced. The mixture is dried, mixed with a conventional pilling aid, if desired, pilled and activated for 6 hours at 1200 F.

Example V

An iron molybdate catalyst was prepared as follows: Some 1250 gs. of low-soda alumina trihydrate was impregnated with a solution of ferric nitrate made by heating a mixture of 475 gs. of $Fe(NO_3)_2.9H_2O$ with 100 c. c. of water until the solution was obtained. The impregnated material was mixed well and dried in a steam oven. Thereafter the dried material was impregnated with 702 c. c. $NH_4MoO_4$(360 gs./liter). The mixture was stirred and dried in the steam oven and then heat-activated at 1150° F. for 6 hours. Some 250 gs. of low-soda plastic clay was added, mixed well in the dry state and 575 c. c. of water was added. After further mixing, the material was dried in the steam oven, pilled and activated for 6 hours at 1200° F.

Example VI

A molybdena catalyst was prepared as described in Example I with the exception that the material was not heat-activated prior to the clay addition.

Example VII

The catalysts prepared in accordance with Examples I, II, V and VI were tested for their hydroforming activity at standard conditions in fixed bed operation. Also, to test the heat resistance of the catalysts different samples of the same batches of the catalysts prepared in accordance with Examples I, II, and VI were first heated in dry air for 6 hours at a temperature of 1450° F. and thereafter subjected to the standard hydroforming test.

The naphtha used in the hydroforming tests was a narrow highly naphthenic fraction having the following inspection.

| | |
|---|---|
| Gravity (Å. P. I.) | 55.7 |
| Anilin point, °F. | 113 |
| Sulfur, weight percent | 0.0058 |
| Reid vapor pressure, lbs./sq. in. | 1.2 |
| Volume percent aromatics | 12.0 |
| Initial B. P., °F. | 222 |
| Final B. P., °F. | 264 |
| Recovery, percent | 98.5 |

The test conditions were as follows:

| | |
|---|---|
| Temperature, °F. | 900 |
| Pressure, lbs./sq. in. | 200 |
| Gas feed, predominantly hydrogen, cu. ft./bbl. | 1500 |
| Feed rate, vols. of oil per vol. of catalyst per hour | 1.3 |

The results of these tests are tabulated below:

| Catalyst of Example No. | Active Metal Component | Test as Prepared | | | | Tests after Heating 6 Hours @ 1450° F., in Dry Air | | |
|---|---|---|---|---|---|---|---|---|
| | | (1) Percent Active Metal Component as MoO₃ | (2) Aniline Point of Product, °F. | (3) Aromatics in Product, Vol. Percent | (4) Toluene on Methylcyclohexane, Vol. Percent | Aniline Point of Product, °F. | Aromatics in Product, Vol. Percent | Toluene on Methylcyclohexane, Vol. Percent |
| I | MoO₃ | 7.9 | 56 | 42.8 | 44 | 56 | 41.7 | 48 |
| II | CoMoO₄ | 13.1 | 29 | 53.3 | 53.8 | 77 | 35.2 | 38.5 |
| V | Fe₂(MoO₄)₃ | 15.5 | 47 | 47.8 | 55.6 | | | |
| VI | MoO₃ | 8.0 | 46 | 42.6 | 48.8 | 69 | 25.8 | 23.4 |

The foregoing data demonstrates that the fresh catalysts prepared in accordance with the invention (II and V) yielded, without exception, substantially more aromatics in the product and substantially more total toluene than either the catalyst prepared in a similar manner but containing only MoO₃ (I) or the catalyst prepared by the old procedure of Example VI. With respect to heat resistance, it is noted that the catalyst of Example II compares well with the catalyst of Example I. Both the catalysts of Examples I and II are far superior in this respect to the old catalyst of Example VI.

The catalysts of the invention also possess high mechanical strength and are in this respect superior to alumina-clay base catalyst prepared by old materials. Numerous modifications of the procedures described will suggest themselves to those skilled in the art without a departure from the spirit of the invention.

When using the catalysts of the invention in commercial hydroforming operations, reaction conditions conventional for such operations may be employed. These conditions may be about as follows:

Temperature, °F_____ 800-1000
Pressure, p. s. i. g_____ 50-1500
Liquid feed rate, v./v./hr_____ 0.2-2.0
Hydrogen feed rate, standard cu. ft./bbl_____ 500-5000

The catalyst is periodically regenerated by burning off carbonaceous deposits at temperatures of about 900°-1100° F.

The above description and exemplary operations have served to illustrate specific embodiments of the invention but are not intended to be limiting in scope.

What is claimed is:

1. The method of producing a hydroforming catalyst which comprises impregnating alumina trihydrate of low sodium content with a solution of water soluble heat decomposable compounds of molybdenum and of an iron group metal of the class consisting of cobalt, iron and nickel, heating the impregnated mass for a period of about 4-8 hours at a temperature of about 1100°-1200° F. to convert said compounds into an oxidic compound of molybdenum with said metal, of the type of a molybdate of said metal and to activate the composite, thereafter mixing the activated composite with a plastic clay of low sodium content, in such proportions as to provide a final catalyst composition which contains from about 5-25 weight per cent of a molybdate of said iron group metal and about 5-25% by weight of clay, and activating the mixture by heating the product for about 4-8 hours at about 1100°-1200° F.

2. The method of claim 1 in which said alumina trihydrate is purified with acetic acid prior to said impregnation.

3. The method of producing a hydroforming catalyst which comprises impregnating alumina trihydrate of low sodium content with an ammoniacal solution of molybdenum trioxide and a cobalt nitrate, said molybdenum trioxide and cobalt nitrate being present in approximately stoichiometric proportions for the formation of a molybdate of said cobalt, said molybdate amounting to about 5-25% of said catalyst, drying the impregnated material, heating the desired material for about 4-8 hours at about 1100°-1200° F. so as to form cobalt molybdate and to activate said material, thereafter mixing the activated material with a plastic clay of low sodium content, wetting, shaping and drying the mixture and heating the dry product for about 4-8 hours at about 1100°-1200° F. to activate the mixture.

4. The method of claim 3 in which said molybdenum trioxide is added in amounts sufficient to introduce about 1-15% of MoO₃ into the catalyst in addition to said molybdate.

5. The method of claim 3 in which said cobalt nitrate is added in amounts sufficient to introduce about 1-15% of cobalt oxide into the catalyst in addition to said molybdate.

6. The method of claim 3 in which said impregnating is carried out in stages with drying of the material between impregnating stages.

7. The method of producing a hydroforming catalyst which comprises impregnating alumina trihydrate of low sodium content with an ammoniacal solution of molybdenum trioxide and nickel nitrate, said molybdenum trioxide and nickel nitrate being present in approximately stoichiometric proportions for the formation of a molybdate of said nickel, said molybdate amounting to about 5-25% of said catalyst, drying the impregnated material, heating the desired material for about 4-8 hours at about 1100°-1200° F. so as to form nickel molybdate and to activate said material, thereafter mixing the activated material with a plastic clay of low sodium content, wetting, shaping and drying the mixture and heating the dry product for about 4-8 hours at about 1100°-1200° F. to activate the mixture.

8. The method of preparing a hydroforming catalyst which comprises separately impregnating alumina trihydrate of low sodium content with an aqueous solution of ammonium molybdate and an aqueous solution of ferric nitrate, in proportions adequate for the incorporation of about 5-25% of iron molybdate into the catalyst, drying the impregnated material, heating the dried material for about 4-8 hours at about 1100°-1200° F. so as to form iron molybdate and to activate said material, thereafter mixing the activated material with a plastic clay of low sodium content, in amounts of about 5-25% based on catalyst, wetting, shaping and drying the mixture, and heating the dry product for about 4-8 hours at about 1100°-1200° F. to activate the mixture.

ROBERT ROWAN, Jr.

References Cited in the file of this patent

UNITED STATES PATENTS

| Number | Name | Date |
|---|---|---|
| 2,417,308 | Lee | Mar. 11, 1947 |
| 2,440,236 | Stirton | Apr. 27, 1948 |
| 2,444,965 | Thomas et al. | July 13, 1948 |
| 2,502,930 | Daussat et al. | Apr. 4, 1950 |